(No Model.) 2 Sheets—Sheet 1.
J. B. ERWIN.
WATER METER.
No. 304,808. Patented Sept. 9, 1884.
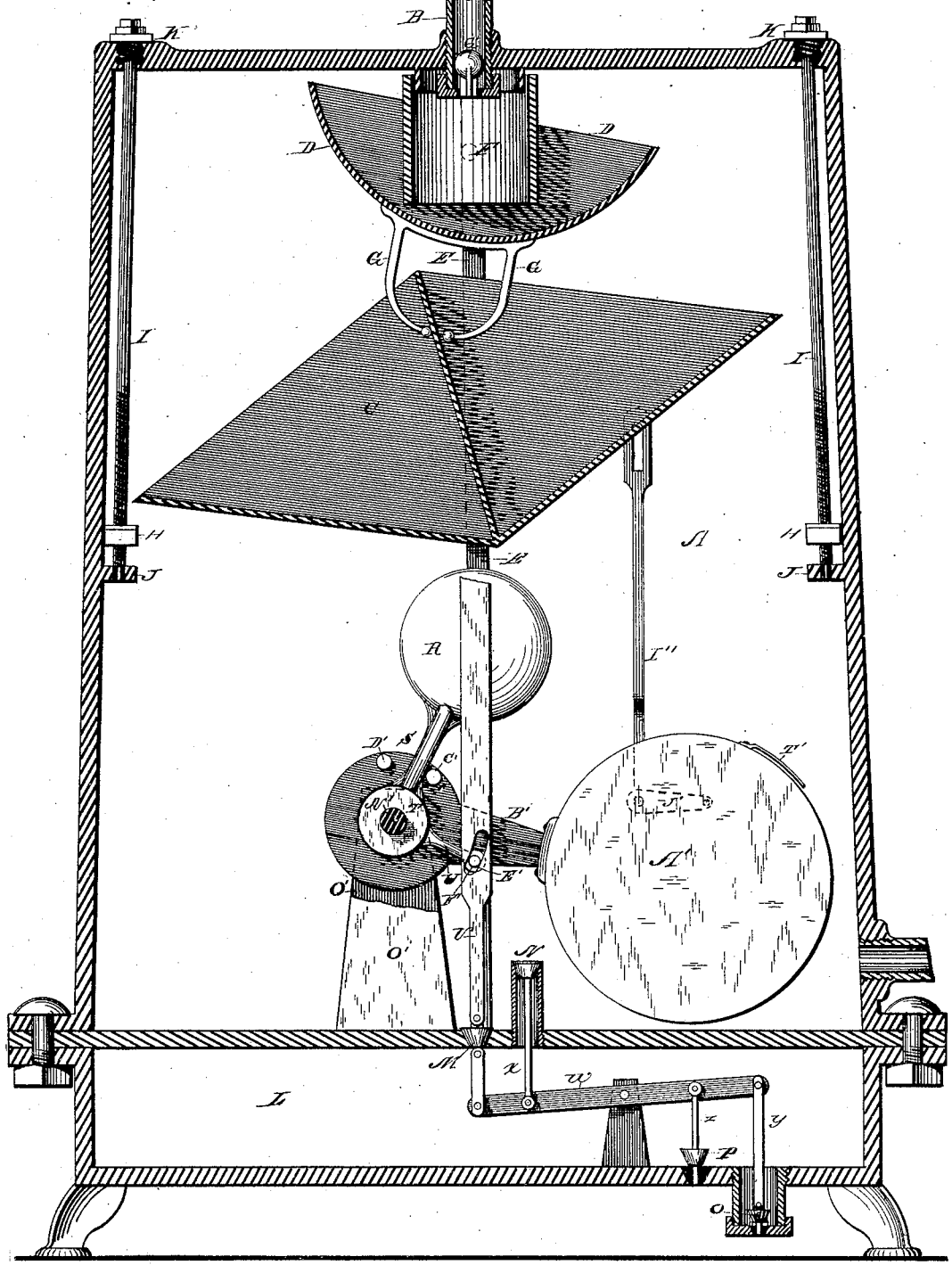

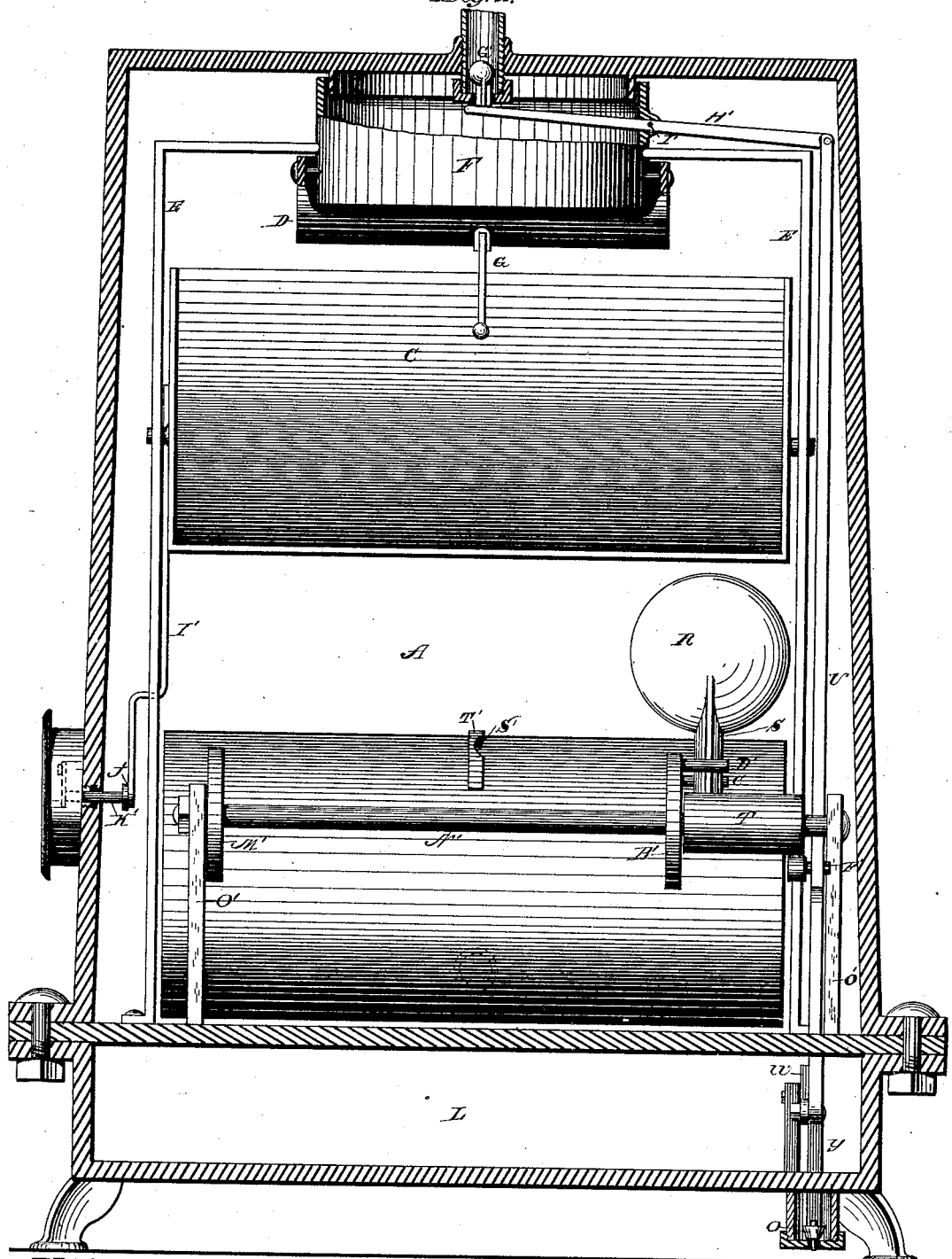

UNITED STATES PATENT OFFICE.

JAMES B. ERWIN, OF MILWAUKEE, WISCONSIN.

WATER-METER.

SPECIFICATION forming part of Letters Patent No. 304,808, dated September 9, 1884.

Application filed December 27, 1883. (No model.)

*To all whom it may concern:*

Be it known that I, JAMES B. ERWIN, a citizen of the United States, residing at Milwaukee, in the county of Milwaukee and State of Wisconsin, have invented certain new and useful Improvements in Water-Meters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.
My invention relates to improvements in that class of water-meters for which Letters Patent of the United States No. 286,285 were granted to me October 9, 1883, which meter consists in a water-receiving air-chamber provided at its upper extremity above the highest limit of the water therein, within the compressed air, with a measure device adapted to receive the water as it is admitted, and automatically discharge the same in uniform quantities below the air-line in said receiver, said measuring device being connected with ordinary registering mechanism, by which the movements of the measuring mechanism is registered and the quantity of water passing through such meter ascertained.

My improvements relate more especially, first, to the device for automatically supplying any deficiency of air within the air-chamber, as may under certain high pressure be required to keep the water from rising too high therein or from coming in too close proximity to the measuring mechanism, and whereby I am enabled to use lower air-chambers or air-chambers of less capacity without liability of the measuring mechanism being flooded, and thereby rendered inoperative, and also whereby any escape of air, either from absorption by water or otherwise, is automatically supplied from time to time, as occasion may require, whereby all liability of the water rising around the measuring mechanism is obviated; second, to the device for regulating the movement of the measuring-bucket, whereby the same is caused to discharge a greater or less quantity of water with each movement.

My invention is further explained by reference to the accompanying drawings, in which Figure 1 represents a vertical section showing a side view of the operative mechanism; and Fig. 2 is also a vertical section thereof, drawn at right angles to that shown in Fig. 1.

Like parts are represented by the same reference-letters in both views.

A is the water-receiving air-chamber, into which water is admitted through pipe B.
C is an oscillating measuring-receptacle.
D is a water-receiving trough.
Both the measuring-receptacle C and trough D are supported upon pivotal bearings in the standards E E.

To the upper ends of the standards E is attached a short duct, F, the upper end of which surrounds the inlet-pipe, while its lower end terminates below the water-line of the water in the trough D, whereby all the water entering said pipe B is led to and discharged in said trough below the surface of the water therein, and the liability of the water spattering thereby avoided. The capacity of the duct F is so much in excess of that of the inlet-pipe that the force of the stream is broken and the water flows gradually over the respective sides of the trough into the respective sides of the measuring-receptacle, said measuring-receptacle being caused to oscillate on its pivotal support by the gravity of the water therein, while it communicates motion to the trough D through the arms G or other suitable means, whereby the stream of water entering the measuring-receptacle is broken and reversed from one side of the measuring-receptacle to the other without closing the inlet, substantially as described in my said previous patent.

The respective apartments of the measuring-receptacle C are slightly larger than required to contain the desired quantity of water, and the measuring-receptacle is so adjusted upon its pivotal support that it will oscillate and empty the containing water before said apartments are quite full. In practice, however, it is found difficult to so nicely adjust said pivotal point as to cause said measuring-bucket to tip with the exact quantity of water; and to overcome such difficulty, and to enable me to use fixed pivotal supports for my measuring-receptacle, the movable stops H H are provided, by which the same desired end is more conveniently accomplished, as such adjustment may be made from the outside of the case, whereby I am enabled to accurately adjust the meter, if desired, while in actual use to conform to any slight discrepancy that may arise in weights or measures by which the same may be tested at different places. The stops H are supported upon the screw-rods I I, which rods have bearings at their lower ends in the brackets J J, while their upper ends project from the inclosing-case through the stuffing-nuts K K, the projecting ends of said rods being provided with angular bearings; by which they are turned when desirous to adjust said stops. The repective stops are so arranged that they arrest the downward movement of the respective sides of the bucket as they descend in the act of emptying.

If upon testing the meter it is found that the quantity of water discharged with each oscillation of the measuring-receptacle is too great, the quantity is diminished by raising said stops, while the opposite result is attained by lowering them. Said stops H H have bearings against the walls of the case, whereby they are prevented from turning with the screw-supporting rods, said stops being raised by turning said rods in one direction and lowered by turning them in the opposite direction.

L is an air-chamber, from and by which such additional quantities of air as may be required in the meter under the varying hydraulic pressure is supplied. The air in the chamber L is displaced and forced therefrom up into the receiver A by the admission of water to said air-chamber from the receiver A. The water, being at greater specific gravity, passes beneath the air in said air-chamber, thereby forcing the air upward through and above the water in said receiver A.

M is a water-valve, through which water is admitted to the air-chamber L from the receiver A. To facilitate the air in passing from the air-chamber L, as it is displaced by water from the receiver, a separate air-valve, N, is provided, through which the air passes upward into the receiver A as the water passes from such receiver to the air-chamber. The water-valve M is located at a slightly greater depth below the surface of the water than the air-valve N, and is thereby subject to an excess of water-pressure over that of the air-valve, which excess of pressure determines the course of the water and air, causing the water to pass down through the lower valve, while the air only passes up through the upper valve.

O is a valve through which the water escapes from the air-chamber.

P is an air-valve through which the air-chamber is vented or filled with air as the water escapes therefrom.

All of the valves M, N, O, and P are simultaneously operated by the gravity of the tumble-bob or vibrating ball R. The ball R is attached to the upper arm, S, of the elbow-crank lever T, while the lower arm, U, of said lever is connected with said valves through the valve-rod V, lever W, and valve-rods X, Y, and Z, respectively. Motion is communicated to the ball R from the float A' through the arm B' and lugs C' and D'. The float is provided with arm M', in addition to arm B', by which arms it is connected at its respective ends to the rod N', around which the float describes a partial circle as it rises and falls. To the rod N' is also attached the elbow crank-lever T, said rod N' being supported at its respective ends in standards O' O'.

E' is a slot formed in the valve-rod V, for the reception of the pintle F', by which pintle motion is communicated from the arm U to said valve-rod, as follows: The pipes leading from the meter being closed, and water being turned onto the meter, the same flows into the trough and measuring-bucket, as described, and from thence to the bottom of the receiver. In my meter as heretofore constructed the water rises to such height corresponding to its pressure as it is capable of compressing the air. By my improvement, the water, as it rises in the receiver, buoys up a float, A', carrying arm B' and lug C', when said lug C' is brought against the arm S, carrying with it the ball R, until said arm S reaches the vertical, at which point the pintle F is brought to the upper extremity of the slot E'. The arm S being carried toward the left slightly past the vertical, it drops of its own gravity upon the other side, whereby the arm U and pintle F' are thrown upward, carrying with them the valve-rod V, whereby the valves M and N are thrown quickly open and the valves O and P simultaneously closed. When the air in the air-chamber is thus trapped in and confined by the valves O and P, it is displaced and forced therefrom by the inflowing water from the receiver A, as heretofore mentioned. Simultaneously with the opening of the valves M and N the valve G', located in the inlet-orifice, is closed, whereby all influx of water is stopped while the air-chamber is being filled, and as a consequence the water in the receiver A is lowered or recedes a distance corresponding to the capacity of the air-chamber. The weight of the float A' is such that it moves down with the receding water, when, acting through arm B' and lug D', it carries the arm S and ball R up toward the right to the vertical, while the pintle F' on arm U moves to the lower extremity of the slot E', when, as said ball R drops toward the right past the vertical, the valve-rod V is carried down therewith, whereby the valves M and N are closed, as shown in Fig. 1, and the valves O, P, and G are simultaneously thrown open, when the water is again admitted into the meters, as before. If the quantity of air in the meter is still insufficient to keep the water from rising too high, the float again rises with the water, and the operation is again and thus continuously repeated until the accumulation of air in the meter prevents the water and float from rising high enough to throw back the tumble-bob R, and as a consequence the inlet-valve is kept open, while the water is retained at too low a point to obstruct the action of the measuring-receptacle. It is obvious that in case the air thus at first accumulated should, through a long interval of time, gradually escape with or be absorbed by the water, the water will again rise, carrying with it said float, until it, acting through the ball and valves, as described, causes a new supply of air to be admitted from the air-chamber, as mentioned. Motion is communicated from the valve-rod V to the valve G' through the lever H'. The lever H' is centrally pivoted to the side of the duct F upon pin I'. The oscillating measuring-receptacle C is connected, through the rod I'', lever J', and pin K', with an ordinary registering device, by which the movements of the measuring-receptacle are registered and the quantity of water passing through the meter ascertained.

S' is an opening through which the compressed air in the receiver enters the float, whereby an equilibrium of pressure is maintained and the liability of the float collapsing from external pressure is obviated. A cap or other shield, T', is provided to prevent the falling water from entering the float through said air-hole.

Having thus described my invention, what I claim as new, and desire to secure by Letters Patent, is—

1. The combination, in a water-receiving air-chamber provided with an inlet-valve, of a float, a tumble-bob, and a separate air-chamber, said chamber being provided with inlet and outlet valves, said float being connected by arms and levers with said tumble-bob, and adapted to communicate motion thereto, said tumble-bob being connected with said valves by rods and arms, through which it communicates motion to them, whereby said float, as it is buoyed up by the influx of water, simultaneously closes the inlet-valve to the receiver, opens communication between said receiver and air-chamber, and closes communication between said air-chamber and the exterior air, and also whereby said float, as it descends with the receding water, reverses the movement of said valves, thereby permitting water to enter the receiver and exterior air to enter and displace the water in said air-chamber, substantially as and for the purpose specified.

2. The combination, in a water-receiving air-chamber of a water-meter provided in its air-space with automatic measuring mechanism, of the air-chamber L, provided with water-inlet valve M and outlet air-valve N, outlet water-valve O, and inlet air-valve P, float A, arms B' and M', one of which arms is provided with lugs C' and D', elbow crank-lever T, provided with arms U and S and weight or tumble-bob R, valve-rod V, lever H', and valve G', said float being adapted, as it rises and falls, to open and close communication to and from said water and air chambers, whereby the required air in the water-receiving air-chamber is supplied and maintained, substantially as and for the purpose set forth.

3. The combination, in a water-receiving air-chamber of a water-meter, of an oscillating measuring-receptacle, C, centrally supported upon pivotal bearings, adjustable stops H H, and screw-rods I, said stops being adapted by their adjustments upon said rods to regulate the movements of said measuring-receptacle, substantially as and for the purpose set forth.

4. In a water-meter, the combination of the standards E E, measuring-receptacle C, duct F, attached to and supported by said standards, stream-reversing trough D, lever H', and rod V, said standards E being adapted to support said receptacle, trough, duct, lever, and valve-rod independently of the inclosing-case, substantially as and for the purpose set forth.

5. In a receiver subject to atmospheric or other pressure, a float provided with an open air-passage, through and by which air may enter and maintain an equilibrium within and without said float, and a cap or shield arranged above said opening, adapted to exclude descending water therefrom, substantially as set forth.

In testimony whereof I affix my signature in presence of two witnesses.

JAMES B. ERWIN.

Witnesses:
EDITH W. ERWIN,
C. T. BENEDICT.